(12) United States Patent
Parke (10) Patent No.: US 11,095,103 B2
(45) Date of Patent: Aug. 17, 2021

(54) DISINTEGRATING BINDERS FOR MULTI-MEMBER CABLE

(71) Applicant: CommScope Technologies LLC, Hickory, NC (US)

(72) Inventor: Daniel J. Parke, Hickory, NC (US)

(73) Assignee: CommScope Technologies LLC, Hickory, NC (US)

( * ) Notice: Subject to any disclaimer, the term of this patent is extended or adjusted under 35 U.S.C. 154(b) by 353 days.

(21) Appl. No.: 16/001,715

(22) Filed: Jun. 6, 2018

(65) Prior Publication Data

US 2018/0358794 A1    Dec. 13, 2018

Related U.S. Application Data

(60) Provisional application No. 62/517,832, filed on Jun. 9, 2017.

(51) Int. Cl.
| | | |
|---|---|---|
| *H01R 43/00* | (2006.01) | |
| *H02G 1/12* | (2006.01) | |
| *H01B 7/02* | (2006.01) | |
| *H01B 3/44* | (2006.01) | |

(Continued)

(52) U.S. Cl.
CPC ........... *H02G 1/1287* (2013.01); *G02B 6/245* (2013.01); *G02B 6/255* (2013.01); *G02B 6/4475* (2013.01);
(Continued)

(58) Field of Classification Search
CPC . H01B 12/06; Y10S 505/886; Y10S 505/887; Y10S 264/75; Y10T 29/49117; Y10T 428/2913; Y10T 428/2924; Y10T 156/1082; Y10T 428/254; Y10T 428/2967; D07B 2801/14; D07B 1/062; D07B 2201/1016; D07B 2201/102; D07B 2201/1092; D07B 2201/2033; D07B 2201/2087; D07B 2501/20; H02G 1/1275; H02G 1/1287
(Continued)

(56) References Cited

U.S. PATENT DOCUMENTS

| | | |
|---|---|---|
| 5,109,658 A | 5/1992 | Garner |
| 5,268,971 A | 12/1993 | Nilsson et al. |

(Continued)

FOREIGN PATENT DOCUMENTS

| | | |
|---|---|---|
| CN | 102 236 139 A | 11/2011 |
| EP | 0 893 722 A1 | 1/1999 |
| JP | 2006 286299 A | 10/2006 |

OTHER PUBLICATIONS

Anonymous, "Polyvinyl Alcohol," Wikipedia, May 16, 2017, XP055505780, Internet, https://en.wikipedia.org.

*Primary Examiner* — Thiem D Phan
(74) *Attorney, Agent, or Firm* — Muncy, Geissler, Olds & Lowe, P.C.

(57) ABSTRACT

A multi-member cable includes at least a first cable element and a second cable element. The first and second cable elements may extend in parallel, be stranded in a helical winding pattern, or be stranded in a reverse-oscillatory winding pattern, along the length of the cable. At least one binder is helically wrapped about the first and second cable elements to hold them together. The binder is formed of a material which disintegrates when exposed to a particular liquid or heat. In a preferred embodiment, the binder may be formed of polyvinyl-alcohol (PVA).

19 Claims, 6 Drawing Sheets

(51) Int. Cl.
    *H02G 1/00*     (2006.01)
    *G02B 6/245*    (2006.01)
    *G02B 6/255*    (2006.01)
    *G02B 6/44*     (2006.01)
    *H01B 11/02*    (2006.01)
    *H01B 9/00*     (2006.01)

(52) U.S. Cl.
    CPC ............ G02B 6/4495 (2013.01); H01B 3/448 (2013.01); H01B 7/0241 (2013.01); H02G 1/005 (2013.01); H02G 1/1275 (2013.01); *G02B 6/4413* (2013.01); *G02B 6/4416* (2013.01); *G02B 6/4429* (2013.01); *G02B 6/4433* (2013.01); *G02B 6/4434* (2013.01); *H01B 9/005* (2013.01); *H01B 11/02* (2013.01); *Y10T 29/49117* (2015.01)

(58) Field of Classification Search
    USPC .................................. 29/825, 828, 850, 868
    See application file for complete search history.

(56) References Cited

U.S. PATENT DOCUMENTS

| | | | |
|---|---|---|---|
| 5,905,834 | A | 5/1999 | Anderson et al. |
| 6,304,701 | B1 | 10/2001 | Bringuier et al. |
| 6,603,094 | B2 | 8/2003 | Miller |
| 7,049,523 | B2 | 5/2006 | Shuman et al. |
| 7,259,332 | B2 | 8/2007 | Shuman et al. |
| 8,620,124 | B1 | 12/2013 | Blazer et al. |
| 8,798,417 | B2 | 8/2014 | Blazer et al. |
| 8,855,454 | B2 | 10/2014 | Quinn et al. |
| 8,909,014 | B2 | 12/2014 | Gimblet et al. |
| 9,042,693 | B2 | 5/2015 | Parris |
| 9,097,875 | B1 | 8/2015 | Blazer et al. |
| 9,261,664 | B2 * | 2/2016 | Tomikawa ........... G02B 6/4494 |
| 9,435,972 | B2 | 9/2016 | Blazer et al. |
| 2008/0271919 | A1 | 11/2008 | Elko |
| 2015/0241652 | A1 | 8/2015 | Blazer et al. |

* cited by examiner

DISINTEGRATING BINDERS FOR MULTI-MEMBER CABLE

This application claims the benefit of U.S. Provisional Application Ser. No. 62/517,832, filed Jun. 9, 2017, which is herein incorporated by reference.

BACKGROUND OF THE INVENTION

1. Field of the Invention

The present invention relates to a jacketed, multi-member cable. More particularly, the present invention relates to a binder or binders for a multi-member cable, which binders hold the members of the multi-member cable together during the manufacturing process, but which may be disintegrated to no longer hold the members of the multi-member cable together after, or during the end of, the manufacturing process. The binders improve access to the cable members during a termination procedure, particularly a mid-span access.

2. Description of the Related Art

Figure 1:
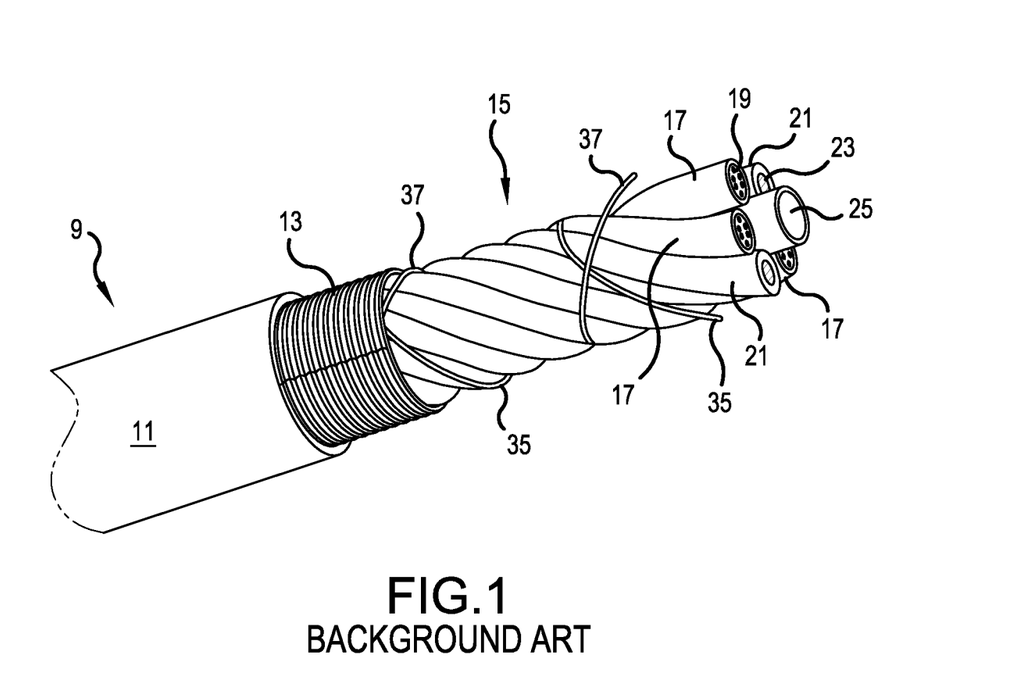
FIG. 1 is a perspective view of a multi-member cable end with a portion of an outer jacket and an armor layer removed to show the elements of the cable core, in accordance with the prior art.

A multi-member cable 9, having many buffer tubes 17 and/or power conductors 21 bundled together, is known in the existing arts. FIG. 1 is a perspective view of a typical multi-member cable 9 having a six-around-one configuration, wherein six buffer tubes 17 and/or power conductors 21 are located around a central strength member 25. In FIG. 1, reference numeral 11 denotes an outer jacket. The outer jacket 11 surrounds an armor layer 13. The armor layer 13 surrounds a cable core 15.

In practice, the cable core 15 is made up of separate cabling elements, such as one or more buffer tubes 17 with loose fibers 19 and/or one or more insulated power conductors 21 with central conductors 23. FIG. 1 shows a six-around-one configuration, or more precisely six cable elements around the central strength member 25. In certain examples, the strength member 25 may be formed as a glass-reinforced plastic (GRP) rod or a fiber-reinforced plastic (FRP) rod. First and second binding threads or tapes, hereinafter referred to as first and second binders 35 and 37, wrap around the cable core 15. Commonly, the first and second binders 35 and 37 are polymer tapes and may be formed of a material like polyethylene, polypropylene, polyurethane or polyester. In the case of a thread, the first and second binders 35 and 37 may be strong cords or yarns. For example, the first and second binders 35 and 37 may be formed of a 1200 denier, water swellable thread, formed of aramid fibers, like KEVLAR or NOMEX.

During the manufacturing process of the multi-member cable 9, the stranding of the cable core 15 changes directions, from clockwise to counterclockwise in a repeating pattern. The direction change point in the stranding is often called a switchback, or strand lay reversal point. Because the cable core 15 has switchbacks, the first and second binders 35 and 37 are needed to hold the cable core 15 together during the manufacturing process, e.g., before the armor layer 13 is applied, and/or before the outer jacket 11 is extruded onto the cable core 15.

Figure 2:
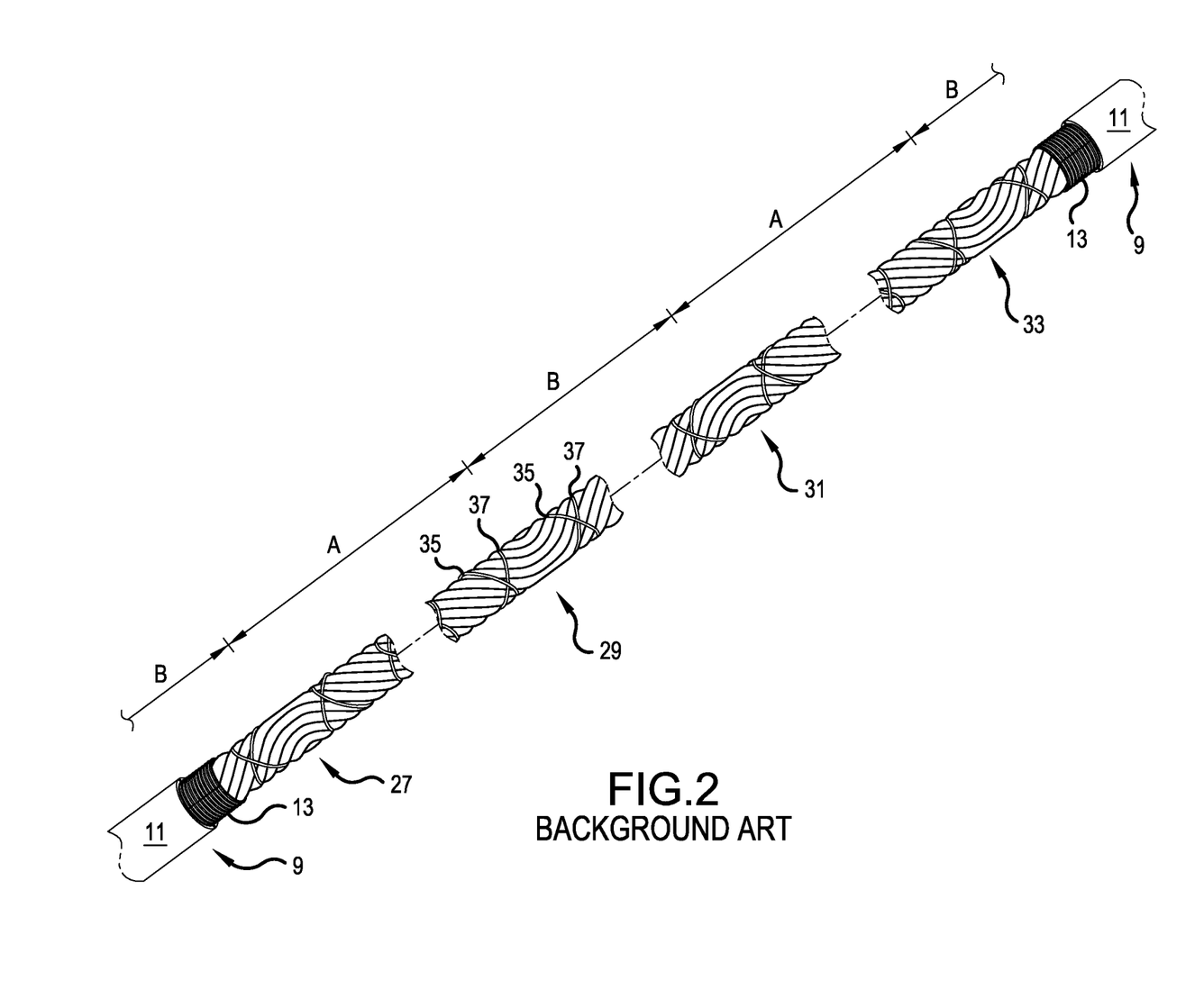
FIG. 2 is a perspective view of the multi-member cable of FIG. 1, with a large mid-section of the outer jacket removed to show the core strand reversal points and the binders.

FIG. 2 is a perspective view of a long length of the multi-member cable 9 with the outer jacket 11 removed to show the inner stranding. A first switchback 27 shows a transition of the strand lay to a clockwise direction (as viewed from the left side of the FIG. 2 to the right side of FIG. 2). A second switchback 29 shows a transition of the strand lay to a counterclockwise direction. A distance A exists between the first switchback 27 and the second switchback 29. The distance A is typically related to the diameter of the multi-member cable 9, e.g., the number of cable elements which make up the cable core 15, and/or the size of the cable elements. Typical diameter ranges are 300 mm to 1,500 mm, such as 400 mm to 1,300 mm.

A third switchback 31 shows a transition of the strand lay from the counterclockwise direction back to the clockwise direction. A distance B exists between the second switchback 29 and the third switchback 31. The distance B is equally to the distance A. The pattern of strand lay reversals continues along the length of the multi-member cable 9. For example, a fourth switchback 33 transitions the strand lay from clockwise to counterclockwise, and so on.

During the manufacturing process of the multi-member cable 9, the stranding of the cable core 15 needs to held together prior to the jacketing process. If the cable core 15 is not held together, the cable elements will separate at the switchbacks 27, 29, 31, 33, etc., due to spring forces placed upon the elements of the cable core 15 during the stranding process. Hence binders, such as the first and second binders 35 and 37, are wrapped around the cable core 15, as the cable core 15 is stranded to keep the cable core 15 intact, e.g., the elements of the cable core 15 in contact with each other. The intact cable core 15 is fed into a machine to apply the armor layer 13 and/or into a machine to extrude the outer jacket 11 over the cable core 15.

Although FIG. 2 has illustrated a multi-member cable 9 having a reverse-oscillating stranding pattern, multi-member cables cables which have no stranding, e.g., parallel cable elements, and/or different stranding patterns, such as a continuous helical stranding pattern (whether it has a consistent pitch or a modulated pitch, where the stranding changes along the length of the cable) may also employ one or more binders to keep the cable core intact during the manufacturing process.

Additional background art can be seen in U.S. Pat. Nos. 5,109,658; 5,268,971; 5,905,834; 6,304,701; 7,049,523; 7,259,332; 8,620,124; 8,798,417; 8,855,454; 8,909,014; 9,042,693; 9,097,875; and 9,435,972; and in U.S. Published Application Nos. 2008/0271919 and 2015/0241652, each of which is herein incorporated by reference.

SUMMARY OF THE INVENTION

The Applicant has appreciated that cable designs, as shown in FIGS. 1 and 2, suffer one or more disadvantages. It is an object of this invention to address one or more of the disadvantages of the cable designs of FIGS. 1 and 2.

One of the reasons that the switchbacks 27, 29, 31 and 33 occur in the core stranding is to provide for mid-span access to the cable elements. Mid-span access refers to a termination technique wherein one or more communication channels and/or power channels of a multi-member cable are accessed at some point between the first and second opposing ends of the multi-member cable. For example, a multi-member cable might extend from a head office to a remote cabinet at the back of a large subdivision of homes. The bundle of cables might pass through a smaller cabinet or enclosure near the front of the subdivision. Inside the smaller enclosure, one or more of the fibers 19 of one or more of the buffer tubes 17 could be accessed and terminated and/or tapped via a splicing operation. In either case, the remaining fibers 19 and power conductors 21 proceed uninterrupted to the remote cabinet at the back of the subdivision.

The switchbacks 27, 29, 31 and 33 allow the bundled cable elements to be spread apart from each other, after a section of the outer jacket 11 and/or the armor layer 13 is removed. Spreading the cable elements apart, greatly facilitates the termination and/or splicing operations.

One method of mid-span access is detailed in an online tutorial video published by Corning Inc. of Corning, N.Y. and may be found at: https://www.youtube.com/watch?v=yfMCUKMLD3o. In the video, a technician shows a multi-member cable including plural tubes with loose fibers, e.g. 96 fibers in total. To access a middle section of the multi-member cable, the technician uses a hook blade or rotary cable splitter to make a first ring cut partially through the outer jacket 11. The technician measures ten inches away and makes a second ring cut partially through the outer jacket 11.

Then, the cable is flexed several times at the first and second ring cut locations until the jacket breaks completely through. The hook blade is used to cut a path, ten inches long, through the outer jacket 11 from the first ring cut to the second ring cut. The section of the outer jacket 11 is then peeled off and discarded. Once the outer jacket is removed, any water blocking tape and/or armor layer 13 is removed.

With the cable core 15 exposed, the core stranding is inspected for a switchback. Once the switchback is found, the technician measures a set distance to each side of the switchback and makes ring cuts on the outer jacket 11 at those points and removes the outer jacket 11 at equal distances on either side of the switchback. The equal distance length is determined by the enclosure into which the mid-span access will be housed for its termination and/or splice operations. In the video, the length for the selected enclosure is fifty-nine inches.

At point 4:45 in the video, the technician uses a ripper or scissors to make multiple cuts to the binders 35 and 37 at several locations along the length of the exposed cable core 15. Then, the binders 35 and 37 are removed and discarded.

Finally, the elements of the cable core 15, e.g., buffer tubes 17, are spread apart and the center strength member 25 is cut proximate the exit of the strength member 25 at each end of the remaining outer jacket 11. One or more of the buffer tubes 17 are opened to access the fibers 19 therein. The fibers 19 may be spliced or terminated, as needed. Then, the portion of the multi-member cable 9 with the outer jacket 11 removed is moved into the interior of the small enclosure for secure and protected storage.

The Applicant has appreciated that each cut made by the technician during a mid-span access process subjects the technician to potential injury, subjects the internal cable elements to potential damage, and takes up the technician's processing time. It is an object of the present invention to eliminate one or more of the cutting processes required by a mid-span access procedure.

These and other objects are accomplished by providing the multi-member cable with binders formed of a material, which disintegrates when exposed to a particular liquid or heat. In so doing, the time consuming task of cutting the binders in many locations along the mid-span access section may be avoided.

The liquid or heat has no effect on the cable elements, but greatly diminishes the strength of the materials forming the binders. In a one embodiment, the binder or binders may be formed of polyvinyl-alcohol (PVA). In a first removal process, the technician can wipe a rag or paper towel, dampened with water, across the exposed cable core to "wipe away" the binders and release the cable elements. In a second removal process, the technician can pass a lighter, or other heat source, quickly along the bottom side of the cable core, to break the binders without damaging the cable elements. These procedures, shorten the processing time, and lessen the chance of damaging the cable elements and/or injuring the technician, as compared to cutting the binders with a bladed tool, as is common in the industry today.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 3:
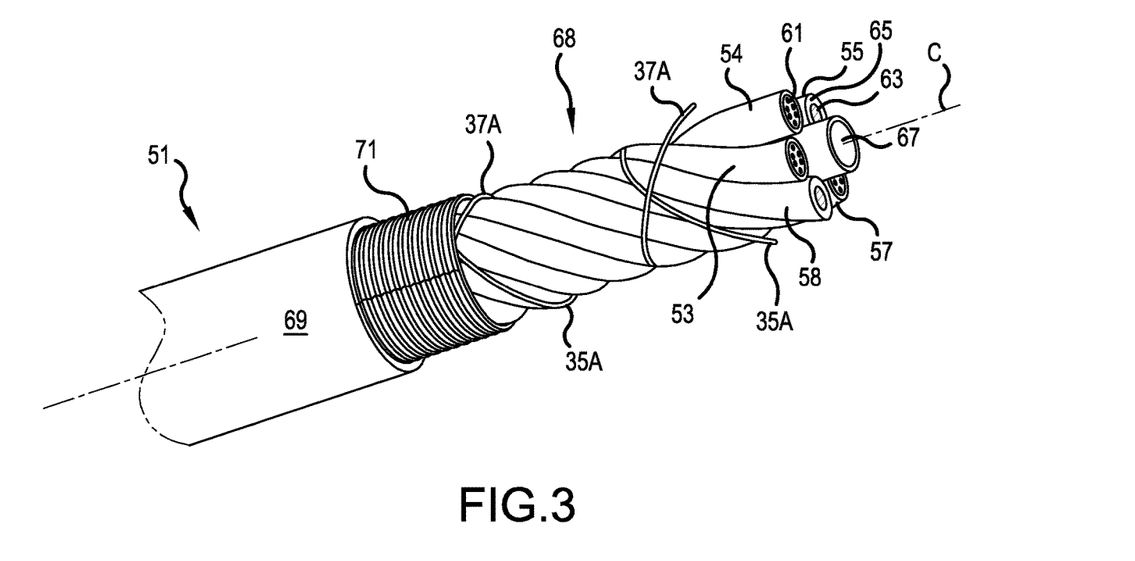
FIG. 3 is a perspective view of a multi-member cable end with a portion of an outer jacket and an armor layer removed to show the elements of the cable core and the new binders, in accordance with the present invention.

FIG. 3 is a perspective view of a multi-member cable 51 having a six-around-one configuration, in accordance with the present invention. The multi-member cable 51 includes first, second, third, fourth, fifth and sixth cable elements 53, 54, 55, 56, 57 and 58. The first, second, fourth and fifth cable elements 53, 54, 56 and 57 are buffer tubes, each with one or more optical fibers 61 therein, e.g., two, four, six or more optic fibers 61 of the single mode or multimode type for transmitting light signals to form communications channels. If plural optical fibers 61 are disposed within a buffer tube, the optical fibers 61 may be loosely held in the buffer tube, or may be attached to each other, e.g., formed as one or more ribbons, within the buffer tube. If a single optical fiber 61 is disposed within the buffer tube, the optical fiber 61 may be tightly buffered, e.g., not loosely held in the buffer tube.

The third and sixth cable elements 55 and 58 are insulated conductors. For example, the third and sixth cable elements 55 and 58 may be 14 gauge conductors 63 surrounded by an insulation layer 65. The conductors 63 may be solid or stranded, and may be of smaller or larger sizes, e.g., 16 gauge, 12 gauge. The conductors 63 may be formed of copper, copper-clad-steel, aluminum or any other metal or alloy with good electrical conductivity. Although buffer tubes and insulated conductors are illustrated, the cable elements may also include other power and/or communication mediums, such as a coaxial power conductor, or a twisted pair within a buffer tube, or as an independent cable element. Further, one or more inexpensive filler rods may replace one or more of the power and/or communication mediums, when the intended deployment does not require all of the power and/or communication channels potentially offered by the multi-member cable 51. In practice, a filler rod has a same general diameter as the active cable elements, and assists in keeping the geometry of the multi-member cable 51 full for jacketing purposes.

In FIG. 3, the first, second, third, fourth, fifth and sixth cable elements 53, 54, 55, 56, 57 and 58 surround a central strength member 67. The central strength member 67 may be formed as a glass-reinforced plastic (GRP) rod or a fiber-reinforced plastic (FRP) rod. The central strength member 67 may be centered on a center axis C of the multi-member cable 51. Finally, an outer jacket 69 surrounds an armor layer 71. The armor layer 71 surrounds a cable core 68, i.e., the six-around-one formation of the first, second, third, fourth, fifth and sixth cable elements 53, 54, 55, 56, 57 and 58 and the central strength member 67.

The cable core 68 may also be configured with more or less cable elements, such as a five-around-one cable core (five cable elements around a central strength member 67), eight-around-one, ten-around-one or twelve-around-one. Also, the cable elements may have more than one orbit around the central strength member 67. For example, twelve-around-six-around-one (twelve cable elements around six cable elements around a central strength member 67) or fifteen-around-nine-around-one.

The outer diameter of the outer jacket 69 depends upon the cable core configuration and the size of the cable elements and the central strength member 67. Typical diameters range from 8 mm to 33 mm, such as 29 mm or 30 mm.

The multi-member cable 51 may optionally include additional elements like a water-blocking tape, water blocking gels inside and/or between the buffer tubes, rip cords, toning signal wires, drain/grounding wires, etc. The ripcords may be provided just beneath the outer jacket 69 and/or the armor layer 71.

FIG. 3 also shows first and second binders 35A and 37A surrounding the cable core 15, and being surrounded by the armor layer 71. The first binder and second binders 35A and 37A are helically wrapped about the cable core 68 so as to hold the first, second, third, fourth, fifth and sixth cable elements 53, 54, 55, 56, 57 and 58 and the central strength member 67 together, e.g., the first cable element 53 abuts the second cable element 54. The first and second binders 35A and 37A have a primary purpose of holding the cable core 68 together during the cable manufacturing process, e.g., when the outer jacket 69 is extruded onto the cable core 68 or onto the armor layer 71.

Figure 4:
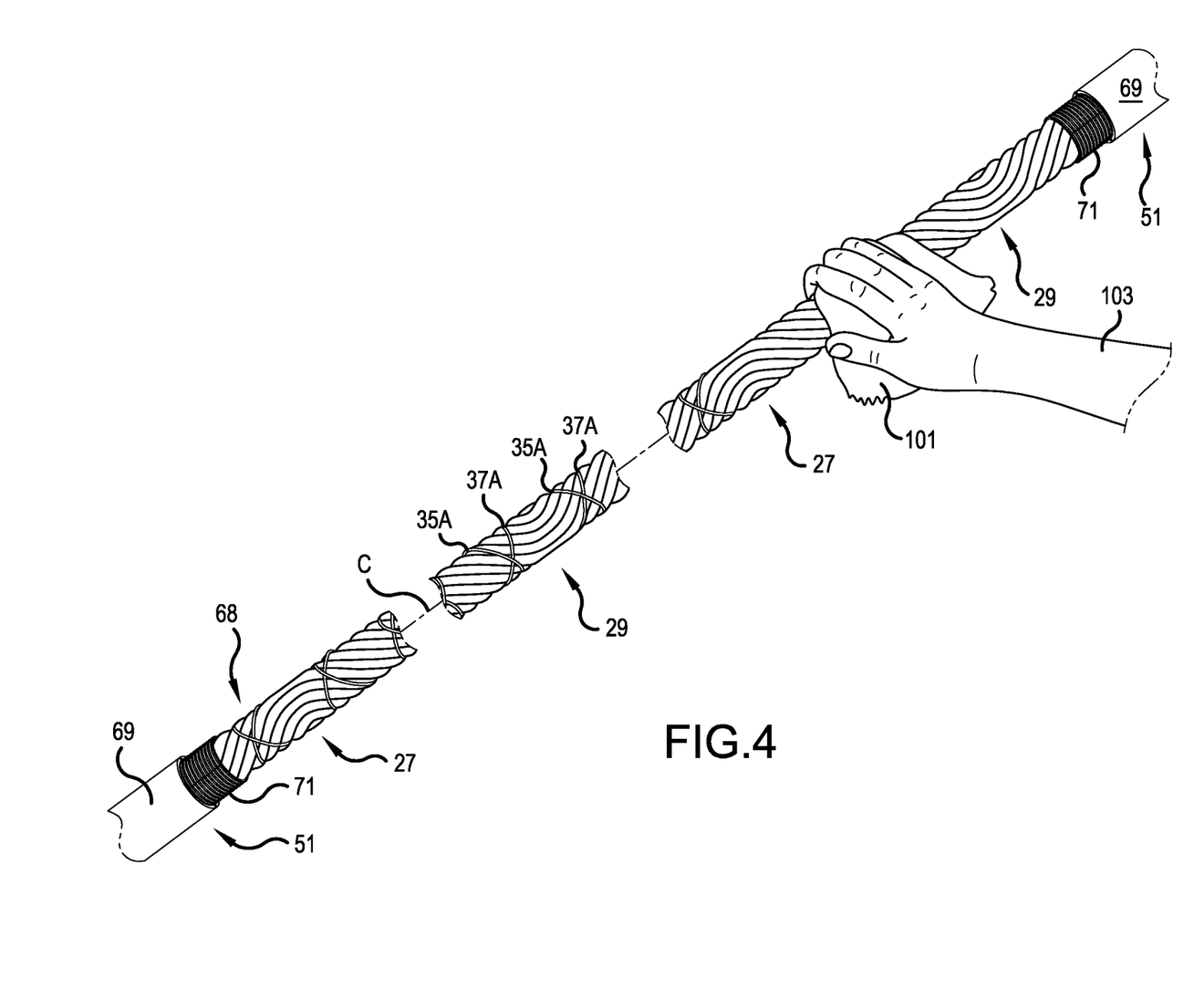
FIG. 4 is a perspective view of the multi-member cable of FIG. 3, with a large mid-section of the outer jacket removed and showing a technician removing the binders with a damp rag, in accordance with the present invention.

As best seen in FIG. 4, the first, second, third, fourth, fifth and sixth cable elements 53, 54, 55, 56, 57 and 58 twist around the center axis C of the multi-member cable 51 three hundred sixty degrees in a counterclockwise direction multiple times to a first reversal point 27. Then, the cable elements twist about the center axis C of the multi-member cable 51 three hundred sixty degrees in a clockwise direction multiple times until a second reversal point 29. The cable elements repeat a pattern of counterclockwise and clockwise twists about the center axis C of the multi-member cable 51 between multiple first and second reversal points 27 and 29 along a length of the multi-member cable 51 to create a strand lay which repeats direction reversals along the length of the multi-member cable 51.

The number of turns between the first and second reversal points 27 and 29 depends upon the cable core configuration and dimension of the cable core elements and the central strength member 67. For example, five and a half turns to six turns might be feasible for the multi-member cable 51 of FIG. 3 with a six-around-one cable core configuration. However, more or fewer turns than five and a half to six turns between reversal points should be considered to be within the purview of the present invention, such as four turns or seven turns or eight turns. The distance between the first reversal point 27 and the second reversal point 29 is between about 300 mm for smaller cables to about 1,500 mm for larger cables. For example, the distance between reversal points 27 and 29 for a small cable might be about 430 mm to about 500 mm, whereas the distance between reversal points 27 and 29 for a larger cable might be between about 1,200 mm and about 1,400 mm. Typically, the distance A of clockwise rotation of the cable core 68 between the first reversal point 27 and the second reversal point 29 is equal to the distance B of counterclockwise rotation of the cable core 68 between the second reversal point 29 and the next, downstream first reversal point 27. However, it is not necessary to the invention that the distance A equal the distance B.

Indications in the form of indicia may be printed or etched into the outer surface of the outer jacket 69. The indicia may be located at each first reversal point 27 along the length of the multi-member cable 51 or at each second reversal point 29 along the length of the multi-member cable 51. Preferably, the indicia are located at all of the first and second reversal points 27 and 29 along the length of the multi-member cable 51. The indicia may be printed/etched on the outer surface of the outer jacket 69 by the same manufacturing equipment which is already printing other indicia on the outer surface of the multi-member cable 51, like the manufacturer's identification, cable part number, manufacture date, length markers, etc.

FIG. 4 also shows the first binder 35A wrapping helically around the cable core 68 in a clockwise direction, so as to hold the elements of the cable core 68 together. The second binder 37A is wrapped helically around the cable core 68 in a counterclockwise direction, so as to hold the elements of the cable core 68 together. The first and second binders 35A and 37A keep the cable core 68 from unwrapping or unraveling at the first and second reversal points 27 and 29 during the manufacturing process. Consequently, the binders 35A and 37A also keep the cable core 68 intact after the outer jacket 69 and armor layer 71 are removed. Hence, the technician typically needed to remove the first and second binders 35A and 37A during a mid-span access operation of the prior art by making multiple cuts along the length of the section of cable core 68 exposed at the mid-span access.

The cutting of the first and second binders 35A and 37A was rather time consuming and exposed the technician and cable elements to a risk of injury. Hence, the present invention has formulated the first and second binders 35A and 37A out of a new material, which does not need to be cut using a blade. The new material provides the first and second binders 35A and 37A with sufficient tensile strength to hold the cable core 68 together during the cable manufacturing process. Yet, the new material disintegrates to a tensile strength which can no longer hold the cable core together as the outer jacket 69 is extruded, or during the mid-span access procedure, as will be more fully explained below.

In a generic embodiment, the first and second binders 35A and 37A are formed of a first material which disintegrates to lose at least 25% of its tensile strength within less than one minute when bought into contact with a liquid having a ph of between 4 and 10 and the liquid being at a temperature of between 32 to 212 degrees Fahrenheit. In a more particular embodiment, the first material disintegrates to lose at least 50% of its tensile strength within less than 30 seconds when bought into contact with the liquid having a ph of between 5 and 9 and the liquid being at a temperature of between 40 to 125 degrees Fahrenheit. In an even more particular embodiment, the first material disintegrates to lose at least 75% to 80% of its tensile strength within less than 30 seconds when bought into contact with the liquid having a ph of between 5 and 9, such as between 6 and 8, and the liquid being at a temperature of between 32 to 212 degrees Fahrenheit, such as between 40 to 125 degrees Fahrenheit. In a preferred embodiment, the first material disintegrates to a paste form, losing at least 90% of its tensile strength within less than one minute, when brought into contact with the liquid, and the liquid is water ($H_2O$).

One suitable material which meets such qualifications for the first material is known as polyvinyl-alcohol (PVA). PVA is a water-soluble synthetic polymer. It has the idealized formula of $CH_2CH(OH)$. It is used in papermaking, textiles, and a variety of coatings. Polyvinyl-alcohol is also known under the abbreviations PVOH and PVAl. Some forms of PVA have a density of 1.19 to 1.31 g/cm3. PVA is resistant to oil, grease and solvents. It has high tensile strength and flexibility. However, these properties are dependent on humidity, in other words, with higher humidity more water is absorbed by PVA. The water, which acts as a plasticiser, will then reduce its tensile strength.

One type of PVA thread is manufactured by the Madeira company (www.madeira.com). Of course, other sources of PVA threads, cords and films also exist. Further, PVA can be purchased in a raw material form, such as a bead or pellet form. Other materials which may be modified or substituted and exhibit similar characteristics to PVA may be included in the list of Poly(Ethenol), Ethenol, homopolymer, Polyviol, Vinol, Alvyl, Alcotex, Covol, Gelvatol, Lemol, Mowiol, Mowiflex, Alcotex, Elvanol, Gelvatol, Lemol, Mowiol, Nelfilcon A, Polyviol and Rhodoviol.

FIG. 4 illustrates a first property of PVA which enables a first removal technique for the first and second binders 35A and 37A. FIG. 4 shows a mid-span access of a multi-member cable. A section of the outer jacket 69 has been removed to expose the cable elements, such as the first and second cable elements 53 and 54, and at least one binder is helically wrapped about the first and second cable elements 53 and 54, such as the first and second binders 35A and 37A.

A sheet of material, such as a paper towel or rag 101, is moistened or dampened with water, and the technician 103 rubs the rag 101 back and forth along the cable core 68. PVA rapidly disintegrates into a "slim" form having no, or almost no, tensile strength when brought into contact with water. Therefore, the first and second binders 35A and 37A become slimy and liquefy, since water acts as a plasticizer for PVA.

Figure 6:
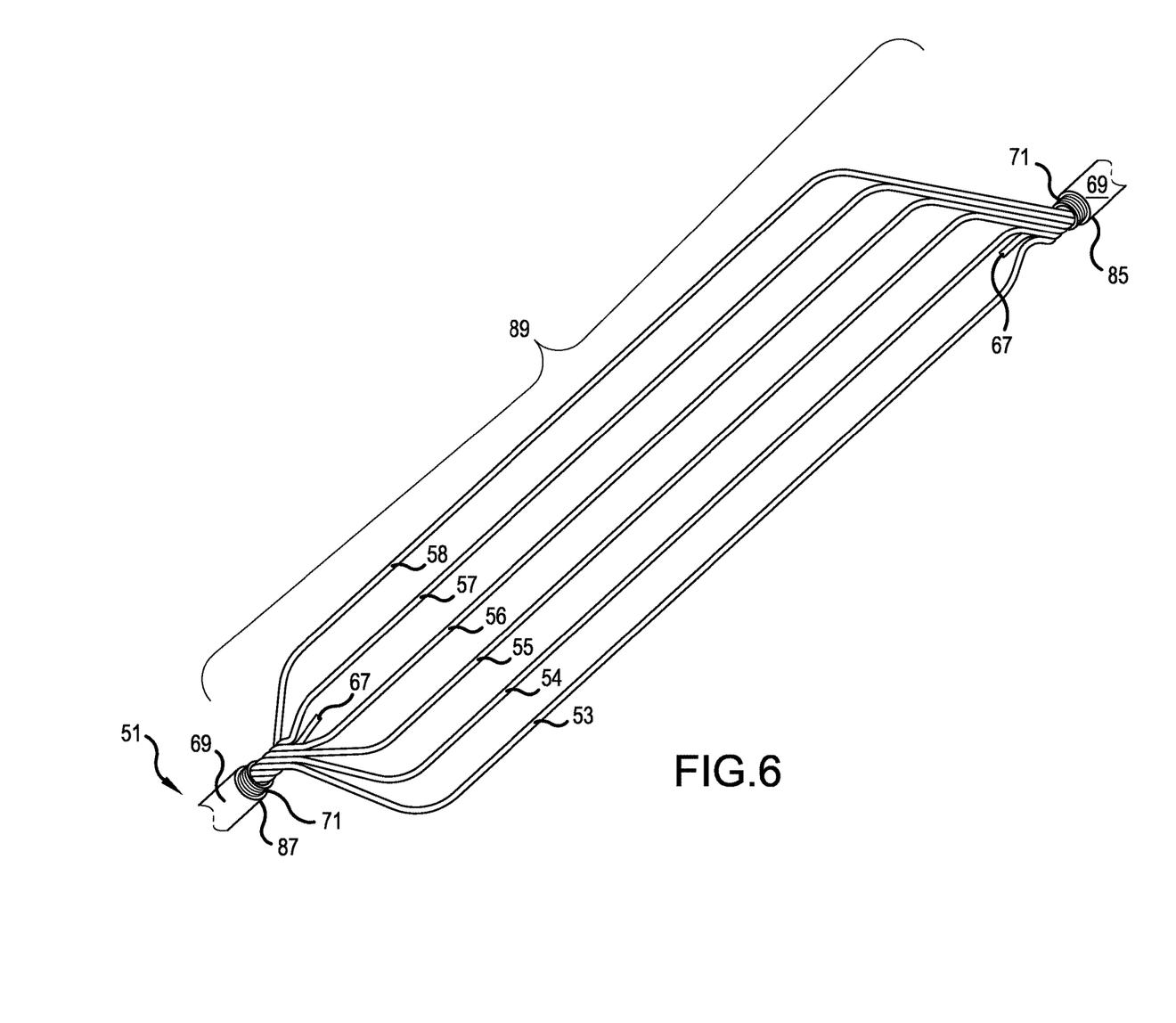
FIG. 6 is a perspective view of a multi-member cable in accordance with the embodiments of the present invention, after the binders have been removed and the cable elements have been spread apart.

The slimy PVA adheres to the rag 101, and hence, the first and second binders 35A and 37A are wiped clean from the cable core 68. This is a much quicker, easier and safer way to remove the first and second binders 35A and 37A, as compared to making multiple cuts using a bladed tool. The cable elements of the cable core 68 are released, freed from each other, and may be separated for a splicing operation, as shown in FIG. 6.

PVA also rapidly disintegrates and changes its chemical composition, undergoing pyrolysis at high temperatures. For example, a mid-section of a cord of PVA will instantly break and the severed ends with shrink back and curl significantly when a high heat source, e.g., a flame passes by a section of the PVA cord for just a few milliseconds. In accordance with one source, PVA has a boiling point of about 445 degrees Fahrenheit (with fully hydrolysed PVA) and 356 to 374 degrees Fahrenheit (with partially hydrolysed grade PVA). PVA decomposes rapidly above 392 degrees Fahrenheit (fully hydrolysed PVA), as it undergoes pyrolysis, and decomposes rapidly at lower temperatures at lower hydrolysed levels.

In a generic embodiment, the first and second binders 35A and 37A are formed of a first material which disintegrates to permanently lose at least 25% of its tensile strength within less than one minute when heated to a temperature greater than 200 degrees Fahrenheit, but less than 600 degrees Fahrenheit. In a more particular embodiment, the first material disintegrates to permanently lose at least 50% of its tensile strength within less than 30 seconds when heated to a temperature greater than 300 degrees Fahrenheit, but less than 500 degrees Fahrenheit. In an even more particular embodiment, the first material disintegrates to permanently lose at least 80% of its tensile strength within less than 30 seconds when heated to a temperature greater than 350 degrees Fahrenheit, but less than 470 degrees Fahrenheit. In a preferred embodiment, the first material disintegrates and undergoes pyrolysis, permanently losing at least 90% of its tensile strength within less than ten second (such as less than one second), when heated to a temperature exceeding 350 degrees Fahrenheit, but not exceeding 470 degrees Fahrenheit.

Figure 5:
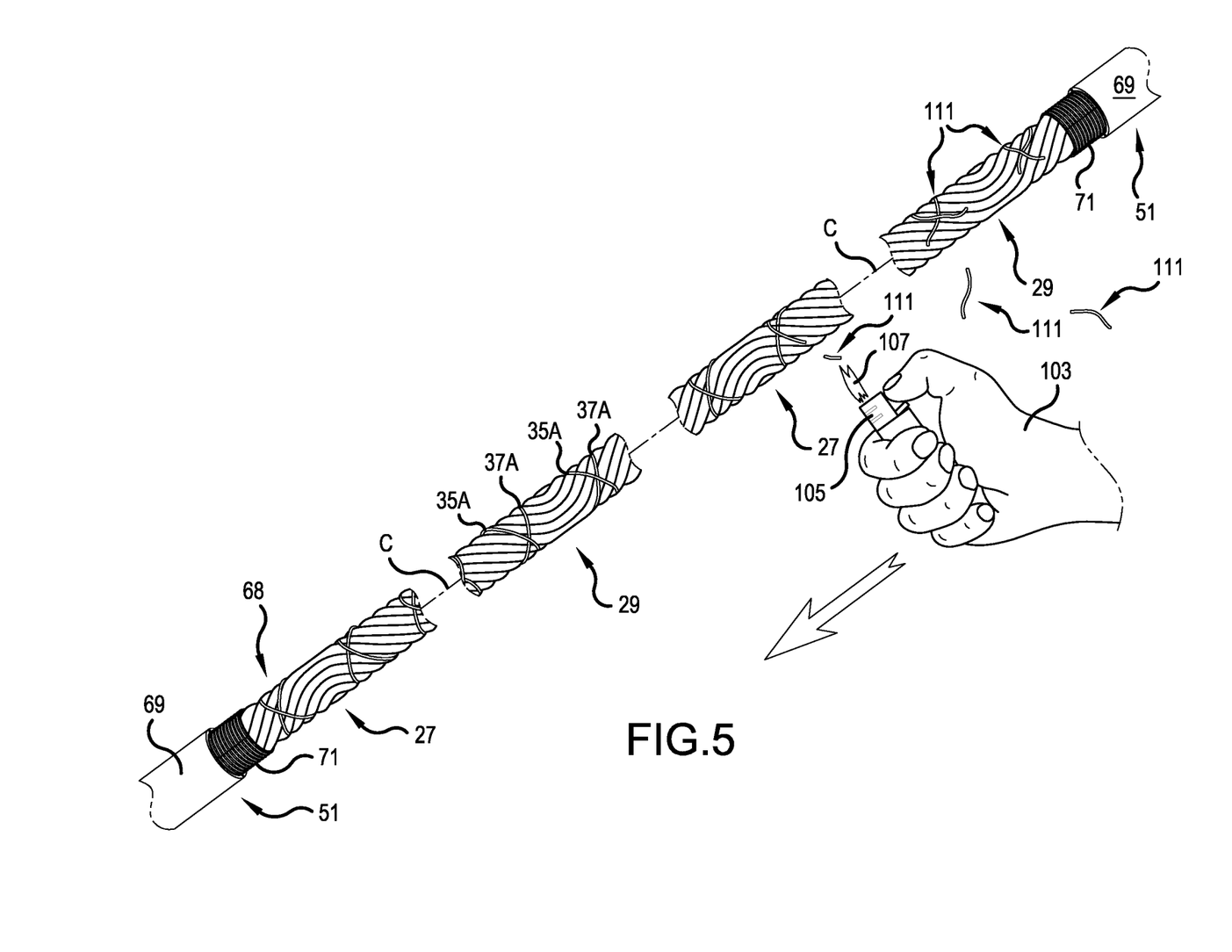
FIG. 5 is a perspective view of the multi-member cable of FIG. 3, with a large mid-section of the outer jacket removed and showing a technician removing the binders with a lighter, in accordance with the present invention.

FIG. 5 illustrates one use of the second property of PVA, which enables a second removal technique for the first and second binders 35A and 37A. FIG. 5 shows a mid-span access of a multi-member cable. A section of the outer jacket 69 has been removed to expose the cable elements, such as the first and second cable elements 53 and 54, and at least one binder is helically wrapped about the first and second cable elements 53 and 54, such as the first and second binders 35A and 37A.

The technician 103 holds a heat source, e.g., a lighter 105, and runs the lighter 105 back and forth along the cable core 68, holding the flame 107 a distance from the cable core 68, like 3 to 4 inches. The distance and speed at which the flame 107 passes beneath the cable core 68 is sufficient to leave the elements 53, 54, 55, 56, 57 and 58 of the cable core 68 unharmed. However, PVA rapidly disintegrates and melts at a break line above the flame almost instantly. Therefore, the first and second binders 35A and 37A become disconnected above the path 109 of the flame 107, and short segments 111 of the first and second binders 35A and 37A are formed, which fall to the floor or can be wiped off of the cable core 68 with a rag or by hand. Hence, the cable elements 53, 54, 55, 56, 57 and 58 of the cable core 68 are released from the central strength member 67, freed from each other, and may be separated for a splicing operation, as shown in FIG. 6.

Another use of the second property of PVA, would be to allow the extrusion temperature of the outer jacket 69 to partially or fully disintegrate the first and second binders 35A and 37A. The extrusion temperature of the outer jacket 69 is approximately 460 degrees Fahrenheit, in the case of an outer jacket formed of high density polyethylene (HDPE). In the case where no armor layer 71 is present, and the outer jacket 69 is extruded directly onto the first and second binders 35A and 37A of the cable core 68, the heat from the outer jacket 69 will most likely disintegrate fully, or at least partially, the majority of the tensile strength of the first and second binders 35A and 37A. It may also be possible to add a heat source to the manufacturing line (just upstream of or during the application of the armor layer 71 and/or the outer jacket 69) to fully or partially disintegrate the first and second binders 35A and 37A. Therefore, wherever the technician removes the outer jacket 69 along the cable 51, the underlying first and second binders 35A and 37A will be able to be wiped off with a dry rag or snapped off by hand with a rubbing action.

As best seen in FIG. 6, a first ring cut 85 and a second ring cut 87 have been made to the outer jacket 69. The armor layer 71 has been removed from the cable core 68 over a section 89. The central strength member 67 has been cut proximate the first ring cut 85 and proximate the second ring cut 87 and the removed section of the central strength member 67 has been discarded. The first and second binders 35A and 37A have been removed and the cable core 68 has been unwound at one or more of the first and/or second reversal points 27 and 29, and the first, second, third, fourth, fifth and sixth cable elements 53, 54, 55, 56, 57 and 58 have been spread apart. The multi-member cable 51 is now ready to perform a mid-span access operation.

In accordance with the present invention, the technician no longer needs to cut off the binders 35 and 37 of the prior art. This saves time, and also reduces the risk of physical injury to the technician and damage to the cable elements 53, 54, 55, 56, 57 and 58 of the multi-member cable 51.

Although the cable core 68 has been illustrated with a reverse-oscillatory winding pattern, the benefits of the first and second binders 35A and 37A to hold cable cores with other configurations together during the manufacturing process will be appreciated by those of skill in the art. For example, the first and second binders 35A and 37A could be used to hold the cable core together where the cable core is helically stranded in only one direction over the entire length of the cable, or where the cable elements extend in parallel, i.e., are not stranded at all over the length of the cable.

Although the description has focused on removing the first and second binders 35A and 37A at a mid-span access, the first and second binders 35A and 37A of the present invention also allow for easy removal at end-of-cable terminations.

During the cable manufacturing process, the first and second binders 35A and 37A, of the present invention may be spooled onto reels, and used in a conventional cable manufacturing machine in the same manner as conventionally constructed first and second binders 35 and 37 (FIGS. 1 and 2). In other words, reels for holding the binder threads or tapes of the conventional cable manufacturing machine are loaded with the binders formed of the new material, like PVA. Although the description has mentioned first and second binders 35A and 37A, the multi-member cable 51 may include only one binder, three binders, four binders, or more binders. In the case of multiple binders, the binders may share a common reel. For example, in the case of four binders, first and third binders may be fed from a first reel in a clockwise direction about the cable core 68, and second and fourth binders may be fed from a second reel in a counterclockwise direction about the cable core 68. Alternatively, one may purchase bulk beads or pellets of the new material, like PVA, and the pellets may be extruded on site into threads or tapes in real time as the multi-member cable 51 is being produced. Details concerning the extrusion of a binder onto a cable core prior to jacketing the cable core can be found in U.S. Patent Application Publication No. 2015/0241652, as previously incorporated by reference.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A multi-member cable comprising:
   a first cable element;
   a second cable element, wherein said first and second cable elements abut each other to form a cable core;
   at least one binder helically wrapped about and surrounding said cable core, so as to hold said first and second cable elements together within said cable core during a cable manufacturing process, wherein said at least one binder is formed of a first material which disintegrates to permanently lose tensile strength when either bought into contact with a liquid or when heated, or both; and
   an outer jacket formed over said first and second cable elements and said at least one binder, wherein said first material disintegrates to permanently lose at least 25% of its tensile strength within less than one minute when bought into contact with a liquid having a ph of between 4 and 10.

2. The multi-member cable according to claim 1, wherein said first material disintegrates to permanently lose at least 25% of its tensile strength within less than one minute when bought into contact with a liquid having a ph of between 4 and 10 and the liquid being at a temperature of between 32 to 212 degrees Fahrenheit.

3. The multi-member cable according to claim 2, wherein said first material disintegrates to lose at least 50% of its tensile strength within less than 30 seconds when bought into contact with the liquid having a ph of between 5 and 9 and the liquid being at a temperature of between 40 to 125 degrees Fahrenheit.

4. The multi-member cable according to claim 2, wherein said first material disintegrates to lose at least 80% of its tensile strength within less than 30 seconds when bought into contact with the liquid having a ph of between 6 and 8 and the liquid being at a temperature of between 40 to 125 degrees Fahrenheit.

5. The multi-member cable according to claim 2, wherein said first material disintegrates to a paste form, losing at least 90% of its tensile strength within less than one minute, when brought into contact with the liquid.

6. The multi-member cable according to claim 2, wherein said first material disintegrates to a paste form, losing at least 75% of its tensile strength within less than 30 seconds, when bought into contact with the liquid having a ph of between 5 and 9 and the liquid being at a temperature of between 32 to 212 degrees Fahrenheit.

7. The multi-member cable according to claim 2, wherein the liquid is water, such that said first material disintegrates when in contact with water.

8. The multi-member cable according to claim 2, wherein said first material is polyvinyl-alcohol.

9. The multi-member cable according to claim 2, wherein said first and second cable elements twist around a center axis of said multi-member cable three hundred sixty degrees in a first direction multiple times.

10. The multi-member cable according to claim 2, wherein said at least one binder is a first binder wrapping helically around said first and second cable elements in a clockwise direction, so as to hold said first and second cable elements together, wherein said first binder is formed of said first material, and further comprising:
    a second binder wrapping helically around said first and second cable elements in a counterclockwise direction, so as to hold said first and second cable elements together, wherein said second binder is formed of said first material, and wherein said outer jacket is formed over said first and second cable elements and said first and second binders.

11. The multi-member cable according to claim 10, wherein said first cable element is either a buffer tube with one or more optical fibers therein or an insulated conductor; and wherein said second cable element is either a buffer tube with one or more optical fibers therein or an insulated conductor, and further comprising:
    a third cable element; and
    a fourth cable element, wherein said first, second, third and fourth cable elements twist around a center axis of said multi-member cable three hundred sixty degrees in the counterclockwise direction multiple times to a first reversal point, then said first, second, third and fourth cable elements twist about the center axis of said multi-member cable three hundred sixty degrees in a clockwise direction multiple times until a second reversal point, and wherein said first, second, third and fourth cable elements repeat the pattern of counterclockwise and clockwise twists about the center axis of said multi-member cable between multiple first and second reversal points along the length of said multi-member cable.

12. The multi-member cable according to claim 11, further comprising:
    a central strength member approximately centered on the center axis of said multi-member cable.

13. The multi-member cable according to claim 1, wherein said first material also disintegrates to permanently lose at least 25% of its tensile strength when heated to a temperature greater than 200 degrees Fahrenheit, but less than 600 degrees Fahrenheit.

14. A multi-member cable comprising:
    a first cable element;
    a second cable element, wherein said first and second cable elements abut each other to form a cable core;
    at least one binder helically wrapped about and surrounding said cable core, so as to hold said first and second cable elements together within said cable core during a cable manufacturing process, wherein said at least one binder is formed of a first material which disintegrates to permanently lose tensile strength when either bought into contact with a liquid or when heated, or both; and
    an outer jacket formed over said first and second cable elements and said at least one binder, wherein said first material disintegrates to permanently lose at least 25% of its tensile strength within less than one minute when heated to a temperature greater than 200 degrees Fahrenheit, but less than 600 degrees Fahrenheit.

15. The multi-member cable according to claim 14, wherein said first material disintegrates to permanently lose at least 50% of its tensile strength within less than 30 seconds when heated to a temperature greater than 300 degrees Fahrenheit, but less than 500 degrees Fahrenheit.

16. The multi-member cable according to claim 14, wherein said first material disintegrates to permanently lose at least 80% of its tensile strength within less than 30 seconds when heated to a temperature greater than 350 degrees Fahrenheit, but less than 470 degrees Fahrenheit.

17. The multi-member cable according to claim 14, wherein said first material disintegrates and undergoes pyrolysis, permanently losing at least 90% of its tensile strength within less than ten seconds, when heated to a temperature exceeding 350 degrees Fahrenheit, but not exceeding 470 degrees Fahrenheit.

18. The multi-member cable according to claim 14, wherein said at least one binder is a first binder wrapping helically around said first and second cable elements in a clockwise direction, so as to hold said first and second cable elements together, wherein said first binder is formed of said first material, and further comprising:
a second binder wrapping helically around said first and second cable elements in a counterclockwise direction, so as to hold said first and second cable elements together, wherein said second binder is formed of said first material, and wherein said outer jacket is formed over said first and second cable elements and said first and second binders.

19. The multi-member cable according to claim 18, wherein said first cable element is either a buffer tube with one or more optical fibers therein or an insulated conductor; and wherein said second cable element is either a buffer tube with one or more optical fibers therein or an insulated conductor, and further comprising:
a third cable element;
a fourth cable element, wherein said first, second, third and fourth cable elements twist around a center axis of said multi-member cable three hundred sixty degrees in the counterclockwise direction multiple times to a first reversal point, then said first, second, third and fourth cable elements twist about the center axis of said multi-member cable three hundred sixty degrees in a clockwise direction multiple times until a second reversal point, and wherein said first, second, third and fourth cable elements repeat the pattern of counterclockwise and clockwise twists about the center axis of said multi-member cable between multiple first and second reversal points along the length of said multi-member cable; and
a central strength member approximately centered on the center axis of said multi-member cable.

* * * * *